United States Patent

Schmidhauser

[15] 3,639,843

[45] Feb. 1, 1972

[54] VOLTAGE TO PULSE-RATIO CONVERTER

[72] Inventor: Rolf Schmidhauser, Los Altos, Calif.

[73] Assignee: Hewlett-Packard Company, Palo Alto, Calif.

[22] Filed: July 20, 1970

[21] Appl. No.: 56,577

[52] U.S. Cl. ....................328/116, 235/183, 307/293, 328/127

[51] Int. Cl. ....................H03k 5/20

[58] Field of Search ....................328/127, 115, 116, 117; 235/183; 307/293

[56] References Cited

UNITED STATES PATENTS 3,463,912 8/1969 Lerman ....................328/127

3,550,018 12/1970 James ....................328/127

*Primary Examiner*—Donald D. Forrer

*Assistant Examiner*—David M. Carter

*Attorney*—A. C. Smith

[57] ABSTRACT

A voltage to pulse-ratio converter having an integrator, a source of reference signals, timing, gating, and logic means arranged to balance an applied input signal with a reference signal during a number $N_2$ of complete clock periods in a measurement period, there being N clock periods in a measurement period where N is an integer, such that the ratio $N_2/N$ of the number $N_2$ of clock periods that the reference signal is applied to the number N of clock periods in a measurement period is proportional to the magnitude of the input signal.

6 Claims, 7 Drawing Figures

PATENTED FEB 1 1972

3,639,843

INVENTOR
ROLF SCHMIDHAUSER

VOLTAGE TO PULSE RATIO CONVERTER

BACKGROUND OF THE INVENTION

Certain known voltage to frequency converters include a capacitor which is charged by an applied input signal for a predetermined time. The input is then removed from the charging circuit and a reference signal is applied until the capacitor is completely discharged. The magnitude of the input signal is indicated by the number of clock pulses that occur during the discharge period. One disadvantage of this technique is that the resolution of the output is dependent on the sensitivity and stability of a level detecting circuit. Changes in capacitor characteristics lead to errors in the transfer characteristic and switching circuitry must be provided to switch the integrator input between the input signal and a reference signal.

Other known voltage to frequency converters are designed to be relatively independent of changes in level detecting circuitry and changes in capacitor characteristics by balancing an input signal to be converted with discharge pulses applied to the summing point of the integrator a number of times during a fixed measurement period. The input signal is applied to the summing point throughout the measurement period eliminating any need for switching circuitry. Known converters of this type apply a discharge pulse whose width is independent of the measurement period and is therefore a source of full scale error in a measurement. With the volt-time area of the discharge pulse kept constant, the number of discharge pulses occurring during a measurement period is proportional to the magnitude of the input signal.

Certain known variations of the above types of converters may be characterized either as being dependent upon level detecting circuitry or as generating a number of discharge pulses during a measurement period.

SUMMARY OF THE INVENTION

The present invention provides a voltage to pulse-ratio converter that synchronizes a measurement period with a clock period such that there is an integer number N of clock periods in a measurement period. The converter applies a discharge pulse to the input of the integrator during a number $N_2$ of complete clock periods so that the ratio of the number of discharge pulses applied to the number of pulses in a measurement period is proportional to the magnitude of an applied input voltage and full scale errors caused by variations in the discharge time are eliminated.

The present invention charges and discharges the capacitor used in the integrator a number of times during a measurement period and therefore is relatively independent of changes in level detecting circuitry and changes in capacitor characteristics.

With the present invention the input signal to be converted is applied to the integrator throughout a measurement period eliminating any need for switching circuitry to switch the integrator input from the input signal to a reference signal.

DESCRIPTION OF THE PREFERRED EMBODIMENT

Figure 1:
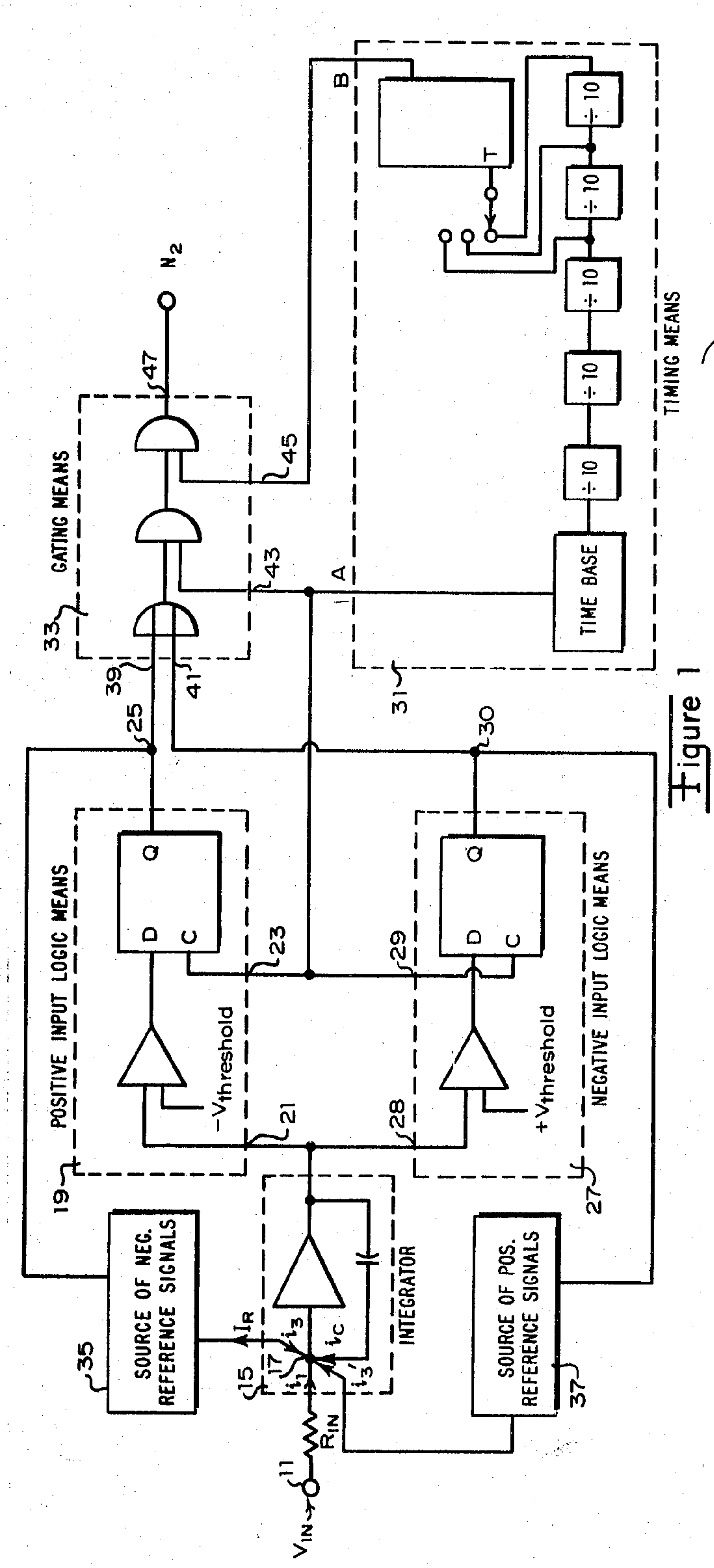
FIG. 1 is a block diagram of the preferred embodiment of the present invention.

Referring to the block diagram of FIG. 1 there is shown the voltage to pulse-ratio converter which includes a conventional integrator 15 comprising a gain-inverting amplifier and a feedback capacitor.

The voltage to be converted is applied at input 11 of the converter. A voltage drop across input resistor $R_{IN}$ causes a current $i_i$ to flow into summing point 17. A current $i_c$ flows from the integrator feedback capacitor into summing point 17. The output of the integrator is connected to inputs 21 and 28 of logic means 19 and 27, respectively.

Figure 2:
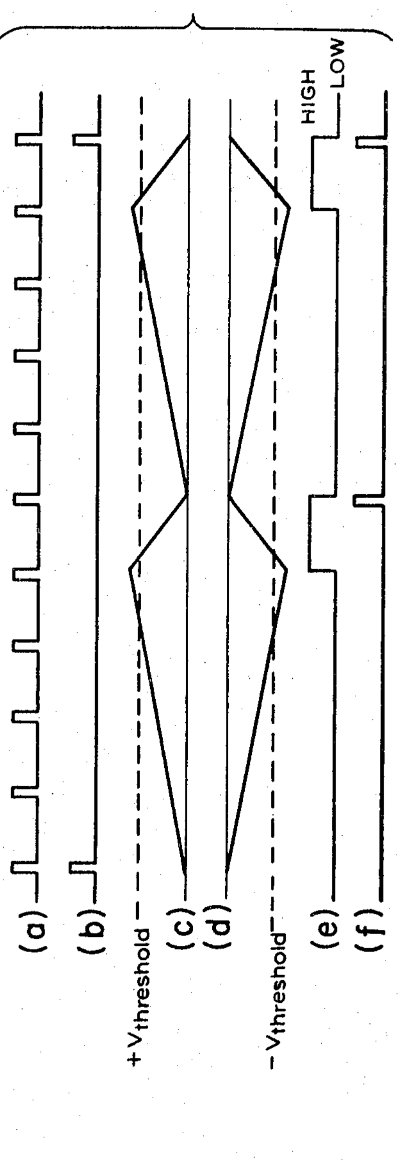
FIGS. 2*a–f* are graphs illustrating typical waveforms produced in the apparatus of FIG. 1 with the apparatus set for 10 volts full scale input.

Logic means 19 is responsive to positive input voltages applied at input 11. The logic means has an integrator input 21, a clock input 23 and an output 25. Included in the logic means is a level detecting amplifier and a conventional D-type master/slave flip-flop. Input 21 is connected to the level detecting amplifier and the output of this amplifier is connected to the "D" input of the flip-flop. Clock input 23 is connected to the clock input of the flip-flop. The output of this flip-flop is connected to output 25 of logic means 19. The trailing edge of a clock pulse applied at input 23 sets output 25 to a low level in response to input 21 being more positive than a negative threshold level. The trailing edge of a clock pulse applied at input 23 sets output 25 to a high level in response to input 21 being more negative than the negative threshold level. FIG. 2*e* represents output 25 of logic means 19 as output 25 changes on the trailing edge of a clock pulse (shown in FIG. 2*a*) from a low to a high level in response to the output of integrator 15 becoming more negative than the negative threshold shown in FIG. 2*d*.

Logic means 27 is responsive to negative input voltages applied at input 11. The logic means 27 has an integrator input 28, a clock input 29 and an output 30 and it differs in operation from logic means 19 in that output 30 is at a low level in response to input 28 being less than a positive threshold level and output 30 is at a high level in response to input 28 being more positive than the positive threshold level. FIG. 2*e* represents output 30 of logic means 27 as output 30 changes on the trailing edge of a clock pulse (shown in FIG. 2*a*) from a low to a high level in response to the output of integrator 15 becoming more positive than the positive threshold shown in FIG. 2*c*.

Timing means 31 produces periodic clock pulses at output A as shown in FIG. 2*a*. At output B of timing means 31 a measurement period is produced which is synchronized with the clock pulses and is an integer number of clock periods in duration as shown in FIG. 2*b*. Output A is connected to clock input 23 of logic means 19 and to clock input 29 of logic means 27.

Output 25 of logic means 19 is connected to a source 35 of negative reference signals. Source 35 applies a negative reference signal to summing point 17 in response to a high level at output 25 of logic means 19, and inhibits application of the negative reference signal in response to a low level at output 25 of logic means 19. Application of the negative reference signal produces a current which flows out of summing point 17.

Output 30 of logic means 27 is connected to a source 37 of positive reference signals. Source 37 applies a positive reference signal to summing point 17 in response to a high level at output 30 of logic means 27 and inhibits application of the positive reference signal in response to a low level at output 30 of logic means 27. Application of the positive reference signal produces a current which flows into summing point 17.

Gating means 33 has a clock input 43 connected to output A of timing means 31 and a clock input 45 connected to output B of timing means 31. Gating means 33 has inputs 39 and 41 connected to outputs 25 and 30 of logic means 19 and 27, respectively, and an output 47.

During a measurement period, "$N_2$" clock pulses are passed through gating means 33 to gating means output 47 in response to a high level either at output 25 of logic means 19 or at output 30 of logic means 27. Pulses are inhibited from passing through gating means 33 in response to low levels at both outputs 25 and 30 of logic means 19 and 27, respectively.

For a positive voltage applied at input 11, the output of integrator 15 will never reach the positive threshold level of logic means 27 and output 30 will remain at a low level. Output 25 of logic means 19 will be set at each clock pulse either to a low level in response to integrator input 21 being more positive than a negative threshold level or to a high level in response to integrator input 21 being more negative than the negative threshold level. This is shown in FIGS. 2*d* and 2*e*.

When output 25 of logic means 19 is at a high level, negative reference signals from source 35 are applied to summing point 17. With output 25 at a high level clock pulses from output A of timing means 31 are passed through gating means 33 to the gating means output 47, as shown in FIGS. 2*e* and 2*f*.

When output 25 of logic means 19 is at a low level, negative reference signals from source 35 are not applied to summing point 17 and clock pulses from output A of timing means 31 are not passed through the gating means 33.

For a positive voltage applied at input 11, the sum of all currents entering summing point 17 must be zero:

$$i_1+i_c+i_3=0 \quad (1)$$

where $i_1$ is the input current, $i_c$ is the current from the feedback capacitor and $i_3$ is the current that results from the application of source 35. During a measurement period $T$:

$$i_1T=(V_{IN}/R_{IN})T \quad (2)$$

$V_{IN}$ being the voltage of the input signal and $R_{IN}$ being the input resistance. The average current from the feedback capacitor during $T$ is given by:

$$i_c=\int_0^T i_c dt=0 \quad (3)$$

The current $i_3$ may be expressed as $$i_3=-I_R\tau N_2 \quad (4)$$

where $\tau$ is the period of a single discharge pulse from output A of timing means 31 and $N_2$ is the number of times during a measurement period discharge pulses from source 35 are applied to summing point 17. Therefore $$(V_{IN}/R_{IN})T=I_R\tau N_2, \text{ and} \quad (5)$$

$$V_{IN}=R_{IN}I_R(\tau/T)N_2 \quad (6)$$

Timing means 31 forces $T$ to be equal in duration to $N\tau$, where $N$ is an integer, and thus:

$$V_{IN}=R_{IN}I_RN_2/N \quad (7)$$

A similar analysis can be made for a negative voltage applied at input 11 and for discharge pulses from source 37.

Therefore the input voltage to be converted in accordance with the present invention is proportional to the ratio of the number $N_2$ of pulses passed through the gating means 33 to the number $N$ of pulses in a measurement period and is independent of changes in a discharge pulse width $\tau$ over a measurement period.

I claim:

1. Apparatus for converting an applied input signal into a ratio of pulses, said ratio being proportional to the amplitude of the input signal during a measurement period; the apparatus comprising:

an integrator having an input connected to receive input signals and an output;

timing means having an output A for producing periodic clock pulses;

logic means operable in first and second logic states represented respectively by outputs of first and second logic levels and having an input connected to the output of said integrator, an input connected to said timing means output A and an output for producing a first logic level output at each clock pulse in response to the output of said integrator attaining a predetermined level and for producing a second logic level output at each clock pulse in response to the output of said integrator being less than the said predetermined level;

a source of reference signal;

means connected to the input of said integrating means and to said source and responsive to the output level of said logic means for applying said reference signal to said integrator input in response to said first logic level output from said logic means, and for inhibiting application of said reference signal in response to said second logic level output from said logic means to apply said reference signal to said integrator input for an integer number of clock periods in duration; and gating means connected to said timing means and to said logic means for providing a number of output pulses which is indicative of the input signal amplitude and which is proportional to the total number of clock periods during which the reference signal is applied to the input of the integrator over a preselected measurement period.

2. Apparatus as in claim 6 wherein:

said logic means responds only to signals of one polarity at the output of said integrator and comprises a second logic means responsive to signals of opposite polarity at the output of said integrator for producing a first logic level output at each clock pulse in response to the output of said integrator attaining a value greater than a first threshold level and for producing a second logic level output at each clock pulse in response to the output of said integrator attaining a value less than said first threshold level.

3. Apparatus as in claim 2 wherein:

said gating means includes gate circuitry connected to said second logic means and is responsive to the output of said logic means and said second logic means for input signals of positive and negative polarity.

4. Apparatus as in claim 3 wherein:

said source of reference signals responds only to the output of said logic means for applying to the input of said integrator a reference signal of only one polarity opposite to one polarity of input signal; and comprising:

an additional source of reference signals opposite in polarity to said source and responsive only to the output of said second logic means for applying to the input of said integrator a reference signal of only one polarity opposite to the other polarity of input signal.

5. Apparatus as in claim 6 wherein: the ratio of clock pulses from output A of said timing means to clock pulses from output B of said timing means is at least 100 to 1.

6. Apparatus as in claim 1 wherein:

said timing means includes circuitry having an output B for providing said preselected measurement period as an integer number of clock periods in duration; and said gating means includes an output, one input connected to said timing means output A, a second input connected to the output of said logic means and a third input connected to said timing means output B for passing clock pulses from said timing means output A through the gating means to said gating means output in response to the first logic level output from said logic means during a measurement period and for inhibiting the passage of clock pulses from said timing means output A through said gating means in response to the second logic level output from said logic means during a measurement period to provide a number of pulses at said gating means output which is proportional to the input signal amplitude during a measurement period.

* * * * *